US008813341B2

(12) United States Patent
Kaufmann et al.

(10) Patent No.: US 8,813,341 B2

(45) Date of Patent: Aug. 26, 2014

(54) DEVICE FOR ATTACHING A LINE TO A CONNECTING ELEMENT

(75) Inventors: Klaus Kaufmann, Wuppertal (DE); Lars Meier, Wuppertal (DE); Christian Staab, Remscheid (DE)

(73) Assignee: Delphi Technologies, Inc., Troy, MI (US)

( * ) Notice: Subject to any disclaimer, the term of this patent is extended or adjusted under 35 U.S.C. 154(b) by 331 days.

(21) Appl. No.: 13/203,859

(22) PCT Filed: Feb. 23, 2010

(86) PCT No.: PCT/EP2010/001149

§ 371 (c)(1), (2), (4) Date: Aug. 30, 2011

(87) PCT Pub. No.: WO2010/105729

PCT Pub. Date: Sep. 23, 2010

(65) Prior Publication Data

US 2011/0302763 A1 Dec. 15, 2011

(30) Foreign Application Priority Data

Mar. 16, 2009 (EP) .................................... 09003761

(51) Int. Cl.

| | |
|---|---|
| ***B23P 11/00*** | (2006.01) |
| ***H01R 43/04*** | (2006.01) |
| ***H01R 43/048*** | (2006.01) |
| ***B23P 19/00*** | (2006.01) |

(52) U.S. Cl.

USPC .................. 29/505; 29/838; 29/861; 29/862; 29/761; 29/753; 29/751; 29/515

(58) Field of Classification Search

USPC ........... 29/761, 838, 858, 861, 862, 753, 505, 29/515, 751, 243.53, 243.5

See application file for complete search history.

(56) References Cited

U.S. PATENT DOCUMENTS

| | | | | | |
|---|---|---|---|---|---|
| 2,535,013 | A | * | 12/1950 | Freedom | 439/877 |
| 2,693,216 | A | * | 11/1954 | Broske et al. | 72/412 |
| 2,789,278 | A | * | 4/1957 | Soreng | 439/877 |
| 3,010,183 | A | | 11/1961 | Forney, Jr. | |
| 3,098,517 | A | * | 7/1963 | Zimmerman, Jr. et al. | 72/397 |
| 4,870,747 | A | * | 10/1989 | Maack et al. | 29/753 |
| 5,099,570 | A | * | 3/1992 | Gerhard, Jr. | 29/751 |
| 5,500,999 | A | * | 3/1996 | Yagi et al. | 29/753 |
| 5,528,815 | A | * | 6/1996 | Webb | 29/509 |
| 5,561,267 | A | * | 10/1996 | Fudoo et al. | 174/84 C |
| 5,768,766 | A | * | 6/1998 | Hatagishi et al. | 29/753 |

(Continued)

FOREIGN PATENT DOCUMENTS

| | | | | | |
|---|---|---|---|---|---|
| JP | 7 014658 | | | 1/1995 | |
| JP | 2012048833 | A | * | 3/2012 | H01R 43/048 |

OTHER PUBLICATIONS

International Search Report dated Aug. 13, 2010.

*Primary Examiner* — Essama Omgba

(74) *Attorney, Agent, or Firm* — Robert J. Myers

(57) ABSTRACT

A device for attaching a line or wire cable to a connecting element includes an upper and a lower die that each has a press surface. At least one recess outside of the press surfaces is provided between the upper and the lower die that decreases the risk of damage to the dies should an erroneous attachment of the wire cable to the connecting element occur.

9 Claims, 3 Drawing Sheets

(56) References Cited

U.S. PATENT DOCUMENTS

| | | | | |
|---|---|---|---|---|
| 6,035,521 | A * | 3/2000 | Schley | 29/753 |
| 6,098,443 | A * | 8/2000 | Muller et al. | 72/412 |
| 6,193,138 | B1 * | 2/2001 | Wada | 228/115 |
| 6,334,251 | B1 * | 1/2002 | Ide | 29/857 |
| 6,394,833 | B1 * | 5/2002 | Bulmer et al. | 439/393 |
| 6,449,841 | B1 * | 9/2002 | Endo et al. | 29/861 |
| 6,722,013 | B1 * | 4/2004 | Rapp | 29/521 |
| 6,880,240 | B2 * | 4/2005 | Kitagawa et al. | 29/753 |
| 6,931,727 | B2 * | 8/2005 | Bulmer et al. | 29/882 |
| 7,409,847 | B2 * | 8/2008 | Wightman et al. | 72/416 |
| 7,494,388 | B2 * | 2/2009 | Kakuta | 439/879 |
| 8,245,396 | B2 * | 8/2012 | Kondo et al. | 29/863 |
| 2002/0189095 | A1 * | 12/2002 | Ito et al. | 29/861 |
| 2007/0234558 | A1 * | 10/2007 | Takada | 29/753 |
| 2008/0141753 | A1 | 6/2008 | Wightman et al. | |
| 2011/0061235 | A1 * | 3/2011 | Takada | 29/863 |
| 2012/0124827 | A1 * | 5/2012 | Baldauf | 29/828 |
| 2013/0104392 | A1 * | 5/2013 | Morikawa | 29/753 |

* cited by examiner

DEVICE FOR ATTACHING A LINE TO A CONNECTING ELEMENT

CROSS-REFERENCE TO RELATED APPLICATION

This application claims the benefit under 35 U.S.C. §371 of published PCT Patent Publication No. PCT/EP2010/001149, filed on 23 Feb. 2010, which claims priority to EP 09003761.5 filed on 16 Mar. 2009, the entire disclosure of which is hereby respectively incorporated by reference herein.

TECHNICAL FIELD

The present invention relates to a device and a method for attaching a line or cable to a connecting element, more particularly, provisions of the device, which include an upper die and a lower die, reduce the probability of damage to the dies if an erroneous attachment of the cable to the connecting element occurs in a predetermined region between the lower die and the upper die.

BACKGROUND OF INVENTION

Devices and methods of this kind are used in electrical connection technology, for example, to make a connection which is no longer releasable between a cable and a connecting element. The cable and the connecting element are in this case connected to each other by plastic deformation, which is brought about by a pressing force. By a connection of this kind, the cable and the connecting element can further be contacted electrically, wherein the connecting element can be designed as any contact element, e.g. as a plug.

The connection between the cable and the connecting element can be made by crimping or splicing, for example. In the case of crimping, usually preformed connecting elements are used, of which the dimensions, particularly their length, are coordinated with the cross-section of the cable. Further, crimping tools have predetermined profiles for bringing about a presettable deformation of the cable and of the connecting element and so forming the crimped connection in a desired shape. In the case of splicing, an endless tape is used instead of a preformed connecting element.

At its simplest, a crimped connection can be produced by means of crimping pliers. If, however, a large number of crimped connections are to be produced within a short time, for example in the manufacture of special cables with special contact elements, automated devices are used. A device of this kind is shown schematically in FIG. 1 and comprises an upper die in which a punch-like lower die engages. The cable and the connecting element pass between pressing surfaces of the upper and lower dies and are pressed together by means of a pressing force which is exerted on the upper or lower die.

As the outer shape of the crimped connection is to be defined by the shape of the pressing surfaces of the upper and lower dies, an extremely small gap between the flanks or side surfaces of the upper and lower dies is necessary. In practice, when making the crimped connection various kinds of errors can nevertheless arise. For instance, the connecting element can already be deformed before it reaches the device. The cable and the connecting element can be displaced or rotated relative to a centre axis of the upper and lower dies. Further, the upper and lower dies can be displaced relative to each other.

As a result, so-called miscrimping can occur, in which material of the cable and/or of the connecting element escapes from the predetermined region between the pressing surfaces and passes between the flanks or side surfaces of the upper and lower dies. Since material of the cable and/or connecting element which is misguided in this way is usually distributed asymmetrically in relation to the centre axis of the upper and lower dies, high torques act on the side surfaces of the upper and lower dies in case of miscrimping, due to the high pressing force. As a result, the upper and lower dies can be displaced relative to each other, and high mechanical stresses occur. Due to the stresses, the upper and lower dies can be deformed or even destroyed. The two side surfaces of the upper die can for example be bent apart by the stresses until a section of the upper die breaks off. Further, the side surfaces and pressing surfaces of the upper and lower dies are greatly stressed by the mechanical stresses, so that grooves can form in the pressing surfaces. Thus miscrimping reduces the life of the upper and lower dies.

It is therefore the object of the invention to provide a device and a method of the kind described above for attaching a cable to a connecting element, by which the probability of damage to an upper and a lower die is reduced if erroneous attachment occurs.

SUMMARY OF THE INVENTION

This object is achieved by a device having an upper die and a lower die where at least one recess outside the pressing surfaces is provided, which is designed to receive a portion of the cable and/or a section of the connecting element. Misguided material of the cable and/or connecting element which, due to erroneous attachment, leaves the region between the pressing surfaces of the upper and lower dies, is received in the at least one recess and so prevented from moving even further away from the region between the pressing surfaces.

As the misguided material is located in general closer to the pressing surfaces on account of the recess, i.e. the distance between the volume elements of the misguided material and the pressing surfaces is shortened in total by the presence of the recess, the lever arm of unwanted torques which act on the side surfaces of the upper and lower dies is shortened by reception of the material in the recess. Hence the unwanted torques and the resulting compressive and tensile stresses on the upper and lower dies are reduced. The load limits at which deformation or damage to the upper and lower dies can occur are therefore considerably higher due to the reduced torques, which leads to a longer life of the upper and lower dies.

The recess between the upper and lower dies further causes both the side surfaces and the pressing surfaces of the upper and lower dies to be subjected to less stress due to the lower compressive and tensile stresses if erroneous attachment occurs. For example, the formation of grooves in the pressing surfaces is reduced, so that the life of the upper and lower dies is lengthened by this means too. Consequently it is possible to make a larger number of attachments or crimped connections with the same upper or lower die.

Advantageously, the distance between one of the boundary surfaces and at least one edge of the recess is shorter than the length, width and depth of the recess. In other words, the recess is located in the immediate vicinity of one of the pressing surfaces, in order to receive misguided material of the cable and/or connecting element immediately after leaving the predetermined region between the pressing surfaces. As a result, the surface section on the side surfaces of the upper or lower die on which misguided material can exert a force before it is received by the recess is reduced. Further, the torque which is exerted on the side surfaces of the upper and lower dies is minimised by the arrangement of the recess in the vicinity of the pressing surfaces, as the length of lever arm which can be produced by the misguided material is minimised.

The recess is advantageously designed as an undercut or in a trough shape, so that the forces which the misguided material exerts on the upper or lower die in the region of the recess are rather oriented tangentially, i.e. in the direction opposite the direction of the actual pressing force, and not at right angles to the side surface of the upper or lower die. As a result, the torque exerted on the side surfaces of the upper and lower dies is additionally reduced. It is further an advantage if the recess has rounded edges, so that the demands on the edge strength of the material from which the upper and lower dies are made are lower. By this means the upper or lower die can be made more cheaply.

The depth of the recess is preferably less than the length and width of the recess. The recess is in other words of rather flat design, so that misguided material of the cable and/or connecting element slides along the side surface of the upper and/or lower die, and so exerts a tangential rather than a normal force on the latter. As a result the torque on the side surfaces can be further reduced. If the recess is provided on a side surface of the lower die, the width of the lower die, which is already small in its upper section anyway, is reduced to a lesser extent in this region by a flat recess than by a deep recess. The lower die is consequently more stable with a flat elongate recess than with a short deep recess.

Outside the pressing surface, advantageously at least one further recess is provided in the upper and/or lower die, and preferably at least two recesses are arranged symmetrically to the pressing surface, as it cannot be predicted what kind of erroneous attachment will occur and at what point misguided material will leave the region between the pressing surfaces. If several recesses are provided and/or at least two of them are arranged symmetrically in relation to the pressing surface, the probability of displacement or damage to the upper and lower dies occurring if erroneous attachment of the cable to the connecting element occurs can thus be further reduced.

The recess is preferably arranged on a side surface of the lower die, i.e. designed as an undercut of the lower die. If the misguided material enters a recess of the lower die, lesser forces occur perpendicularly to the direction of pressing than if it enters a recess of the upper die located further towards the outside. As the misguided material is moreover located closer to the centre axis of the device, the torque exerted on the side surfaces of the upper and lower dies is in general lower.

Alternatively or in addition, a recess can also be arranged on a side surface of the upper die. In this case the recess as such has a lesser effect on the strength of the device, as the upper die usually has a greater volume than the lower die.

A further subject of the invention is a method for attaching a cable to a connecting element. The cable and the connecting element are in this case pressed into a predetermined region between a pressing surface of each of the upper die and lower die. A portion of the cable and/or a section of the connecting element is, when the latter leaves the region between the pressing surfaces, received in a recess provided between the upper die and the lower die outside the pressing surfaces, to avoid damage to the lower die and/or upper die.

Advantageous embodiments of the invention can be found in the subsidiary claims, the description and the drawings.

BRIEF DESCRIPTION OF THE DRAWINGS

The invention will be described below with the aid of an advantageous embodiment with reference to the drawings. They show.

DETAILED DESCRIPTION

Figure 1:
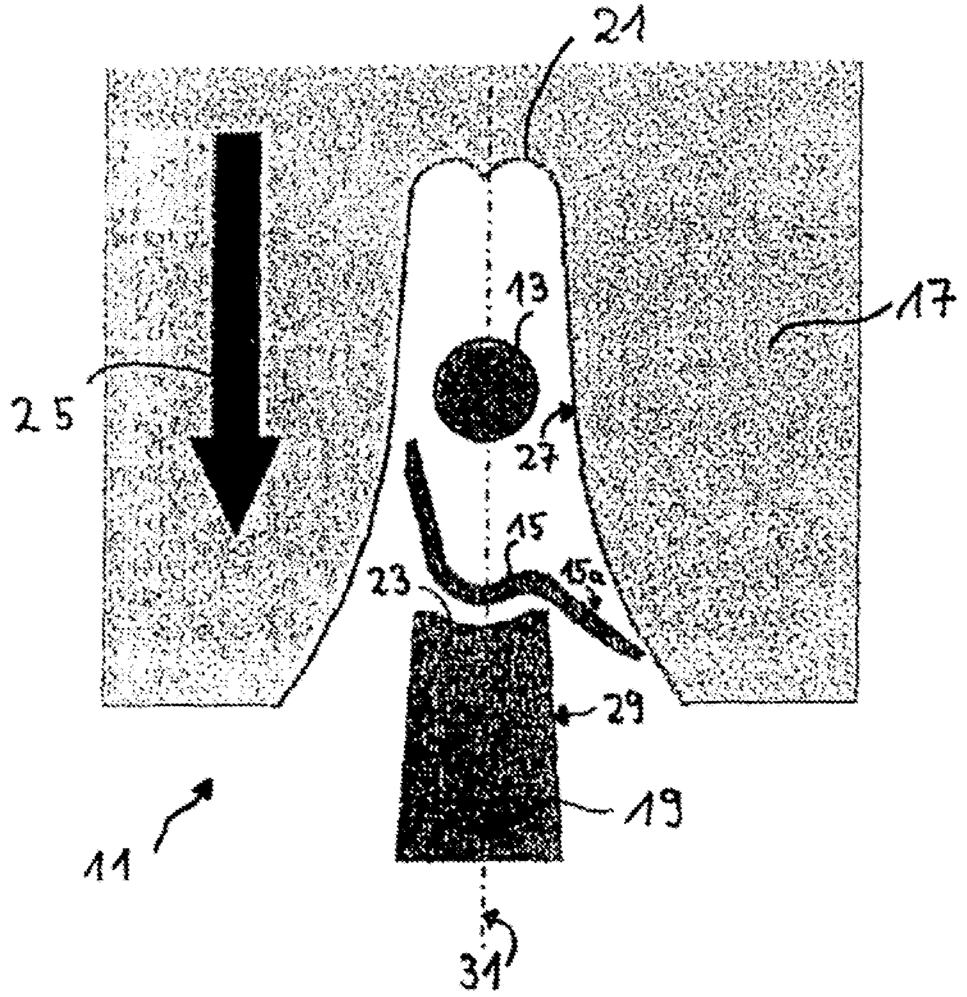
FIG. 1 PRIOR ART
FIG. 1 a schematic view of a device for attaching a cable to a connecting element according to the state of the art, FIG. 2 a schematic view of a device according to the invention, and FIGS. 3*a* and 3*b* in each case an enlarged detail of FIG. 1 or 2.

FIG. 1 shows a device 11 for attaching a cable 13 to a connecting element 15 according to the state of the art. The device comprises an upper die 17 in which a punch-like lower die 19 engages. The upper die 17 and the lower die 19 have in each case a pressing surface 21 or 23, by which the shape of a crimped connection which is made by attaching the cable 13 to the connecting element 15 is fixed.

The cable 13 can comprise several cable strands. The connecting element 15 is shown by way of example as a core claw, so that a so-called core crimp is produced by attachment of the cable to the core claw. By means of the device 11, however, for example an insulation crimp can also be produced, in which insulating material is provided between the connecting element and the cable.

The upper die 17 is pressed against the lower die 19 by a pressing force which acts in the direction of the arrow 25. As a result, the cable 13 and the connecting element 15 are deformed plastically, and a permanent, no longer releasable connection is formed between them.

Figure 3A:
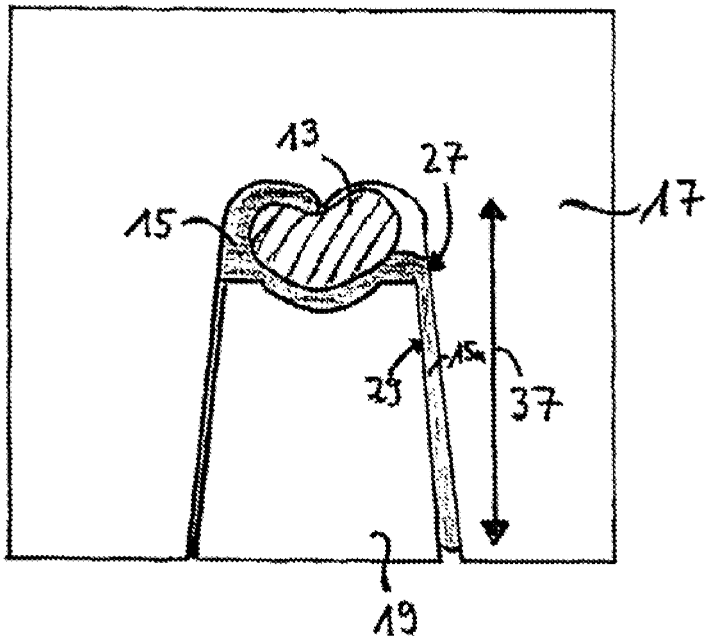
FIG. 3A PRIOR ART

Erroneous attachment of the cable 13 to the connecting element 15 occurs for example if its right half 15*a*, as shown in FIG. 1, is erroneously bent downwards. When the upper die 17 is pressed against the lower die 19, the right half of the connecting element 15 is consequently located outside the determined region which is located between the pressing surfaces 21 and 23. As shown in FIG. 3*a*, the section 15*a* of the connecting element passes between the side surfaces 27 and 29 of the upper and lower dies, and causes very strong forces to occur on account of an extremely small gap which is necessary between the side surfaces 27 and 29 to produce the crimped connection. These forces can displace the upper die 17 and the lower die 19 relative to each other. Further, the forces and the resulting torques lead to very high mechanical stresses in the upper die 17 and lower die 19, with the result that they can be deformed or even destroyed.

Erroneous attachment of the cable 13 to the connecting element 15 can also occur, apart from by a bent connecting element 15 as shown in FIG. 1, due to the fact that the upper die 17 and lower die 19 are displaced relative to each other in relation to a common centre axis 31. Also the cable 13 and/or the connecting element 15 can be displaced in relation to the centre axis 31.

Figure 2:
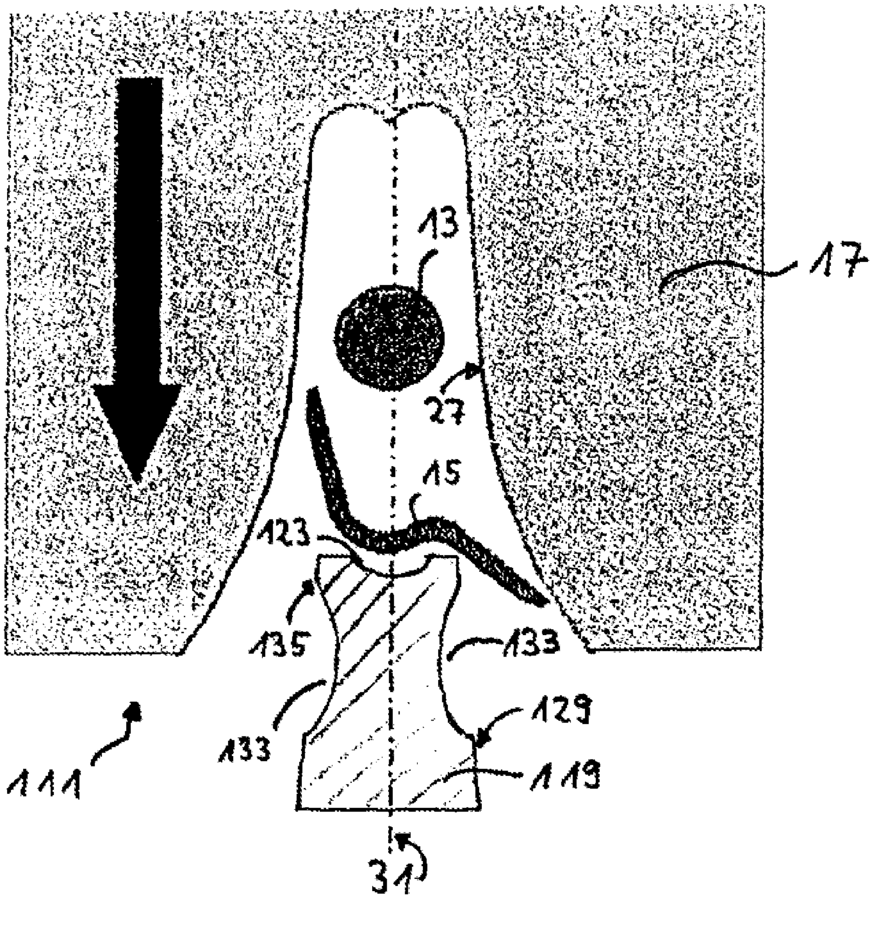

FIG. 2 shows a device 111 according to the invention for attaching a cable 13 to a connecting element 15, which has a modified lower die 119 with which the problems described above are solved. By contrast with FIG. 1, the lower die 119 has on each of the two side surfaces 129 a recess 133 in which misguided material, which can escape from the cable 13 and/or the connecting element 15, is received. The two recesses 133 are designed as an undercut and arranged symmetrically to the centre axis 31 or to the pressing surface 123 of the lower die 119, in order to be able to receive misguided material on both side surfaces 129.

Due to the recesses 133, the lower die 119 is tapered below the pressing surface 123, and the width of the lower die 119 is greater in the region of the pressing surface 123 than in the region of the taper. The recesses 133 are trough-shaped and have rounded edges 135 to facilitate entry of the misguided material into the recess 133. Further, as a result there are no increased demands on the edge strength of the material from which the lower die 119 is made.

The depth of the trough-shaped recesses 133 is considerably less than their length along the respective side surface 129. If the misguided material enters the recess 133 and spreads out in it, only tangential forces and not normal forces are exerted on the side surfaces 129 of the lower die 119 as a result. The volume which is defined by the recesses 133 between the lower die 119 and the upper die 17 is preferably selected so that enough misguided material can be received in the recesses 133. The volume defined by the two recesses 133 can for example correspond to the volume of the connecting element 15.

As the misguided material is received in the recesses 133, lesser forces are exerted on the side surfaces 129 and 27 of the lower die 119 and upper die 17 respectively, than would be the case if a lower die 19 shown in FIG. 1 were used. As a result, the probability of damage to the upper and lower dies 17 and 119 is reduced and hence the life of the whole device 111 is lengthened.

Figure 3B:
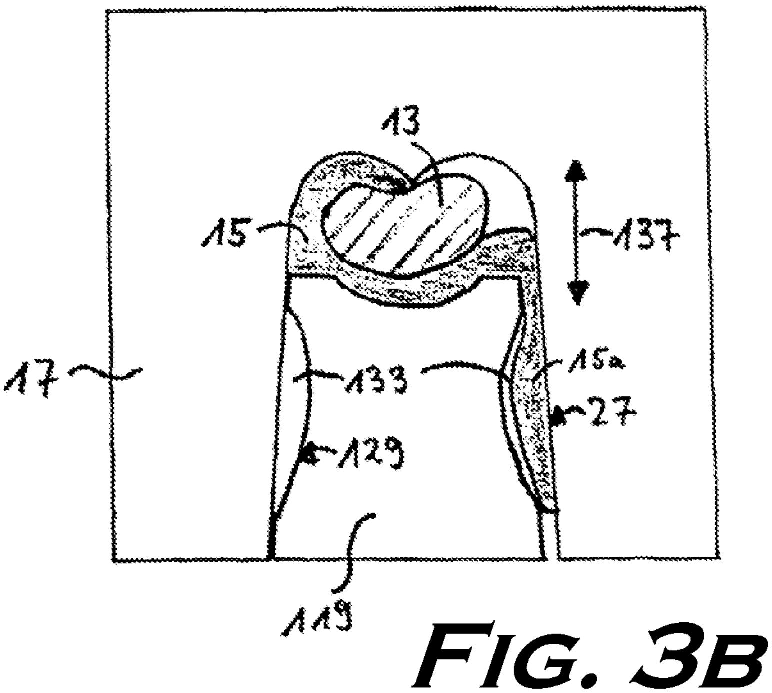

The reduction of the forces which act on the side surfaces 27, 29 and 129 of the upper and lower dies 17, 19 and 119 respectively is shown in FIGS. 3*a* and 3*b*. These show an enlarged detail of FIGS. 1 and 2, wherein the cable 13 and the connecting element 15 are already pressed into the predetermined region. Material of the connecting element 15 has escaped from the predetermined region along the side surfaces 27, 29 and 129 of the upper die 17 and lower die 19 and 119. The misguided material is on average further away from the predetermined region in FIG. 3*a* than in FIG. 3*b* on account of the lack of a recess 133 of the lower die 19, and exerts forces with a relatively long lever arm 37 on the side surfaces 27 and 29 of the upper and lower dies 17 and 19 respectively. As a result, considerable torques and mechanical stresses are exerted on the upper die 17 and the lower die 19.

The misguided material in FIG. 3*b* is received in the recess 133 of the lower die 119 according to the invention. The dimensions of the recesses 133 can preferably be selected so that the material received in most cases no longer touches one of the side surfaces 27, 29 or 129 over the whole surface. As a result the material received in the recess 133 exerts no or only very minor forces on the side surface 129 of the lower die 119 or on the side surface 27 of the upper die 17, and the resulting lever arm 137 compared with the lever arm 37 shown in FIG. 3*a* is considerably shortened.

Due to the shortened lever arm 137, the mechanical stresses within the upper die 17 and the lower die 119 are reduced. Consequently the probability of damage to the upper and/or lower die 17 or 119 occurring in case of erroneous attachment of the cable 13 to the connecting element 15 is lower. Further, the side surfaces and pressing surfaces 27, 129, 21 and 123 are subjected to less stress due to the lower mechanical stresses, so that the formation of grooves is less likely, particularly on the surfaces 27 or 123. Thus the life of the upper die 17 and the lower die 119 is in general lengthened by the recess 133, so that larger numbers of crimped connections can be made without having to exchange the upper and/or lower die 17 or 119.

The invention claimed is:

1. A device for attaching a cable to a connecting element, comprising:

a first die having a first pressing surface and having a first side surface adjacent the first pressing surface; and a second die having a second pressing surface configured to press the cable and the connecting element in a predetermined region between the first die and the second die and having a second side surface adjacent the second pressing surface and outside of the predetermined region, wherein the second side surface defines a first concave recess which is configured to receive a portion of the connecting element when the portion of the connecting element is erroneously bent out of the predetermined region and wherein the first recess defines a taper outside of the second pressing surface and a width of the second die is greater in a region of the second pressing surface than in a region of the taper;

wherein the second pressing surface defines an inwardly curved surface which is substantially equal in curvature to an outer shape of the connecting element after attachment to the cable, and wherein the first side surface is configured to extend outwardly past the first concave recess when the cable and the connecting element are pressed between the first and second surfaces.

2. The device according to claim 1, wherein a distance between the second pressing surface and at least one edge of the first recess is shorter than a length, a width, and a depth of said first recess.

3. The device according to claim 1, wherein the first recess defines a trough shape.

4. The device according to claim 1, wherein the first recess has rounded edges.

5. The device according to claim 1, wherein a depth of the first recess is less than a length and a width of the first recess.

6. The device according to claim 1, wherein the second die has a third side surface that defines a second concave recess.

7. The device according to claim 6, wherein the first and second recesses are arranged symmetrically to the second pressing surface.

8. The device according to claim 1, wherein the first recess defines an arcuate concave shape.

9. A method for attaching a cable to a connecting element comprising:

pressing the cable and the connecting element in a predetermined region between a first pressing surface of a first die having a first side surface adjacent the first pressing surface and a second pressing surface of a second die having a second side surface adjacent the second pressing surface and outside of the predetermined region, to form a connection part wherein the second side surface defines a concave recess and wherein the recess defines a taper outside of the second pressing surface and a width of the second die is greater in a region of the second pressing surface than in a region of the taper;

wherein the second pressing surface defines an inwardly curved surface which is substantially equal in curvature to an outer shape of the connecting part, and wherein the first side surface is configured to extend outwardly past the first concave recess when the cable and the connecting element are pressed between the first and second surfaces, and;

receiving a portion of the connecting element in the concave recess when the connecting element is erroneously forced between said first side surface and said second side surface out of said predetermined region so that damage to the first die and/or second die is prevented.

* * * * *